(12) United States Patent
Nakai et al.

(10) Patent No.: US 9,052,444 B2
(45) Date of Patent: Jun. 9, 2015

(54) ACTIVE ENERGY RAY-CURABLE RESIN COMPOSITION, AND PRODUCTION METHOD FOR PRODUCTS WITH SURFACES OF FINE CONCAVE-CONVEX STRUCTURES

(75) Inventors: Yusuke Nakai, Otake (JP); Tadashi Nakamura, Tokyo (JP); Tetsuya Jigami, Otake (JP); Satoru Ozawa, Otake (JP); Eiko Okamoto, Otake (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 13/635,318

(22) PCT Filed: Mar. 24, 2011

(86) PCT No.: PCT/JP2011/057246
§ 371 (c)(1),
(2), (4) Date: Sep. 14, 2012

(87) PCT Pub. No.: WO2011/118734
PCT Pub. Date: Sep. 29, 2011

(65) Prior Publication Data
US 2013/0011572 A1     Jan. 10, 2013

(30) Foreign Application Priority Data
Mar. 25, 2010  (JP) .................................. 2010-070282

(51) Int. Cl.
*H05H 1/30* (2006.01)
*H05H 1/46* (2006.01)
(Continued)

(52) U.S. Cl.
CPC ............... *G02B 1/118* (2013.01); *B29C 33/58* (2013.01); *B29C 39/148* (2013.01); *B29C 39/18* (2013.01);
(Continued)

(58) Field of Classification Search
CPC ............... B29C 2035/0827; B29C 2035/0833; B29C 33/58; B29C 39/148; B29C 39/18
USPC .......................................................... 427/575
See application file for complete search history.

(56) References Cited

U.S. PATENT DOCUMENTS 4,113,917 A *  9/1978  Tugukuni et al. ............. 428/407
7,835,080 B2 * 11/2010  Taguchi et al. ............... 359/574
(Continued)

FOREIGN PATENT DOCUMENTS

JP     2004-351693 A    12/2004
JP     2005-156695 A     6/2005
(Continued)

OTHER PUBLICATIONS

International Search Report issued on Jun. 14, 2011 in PCT Appln. PCT/JP2011/057246.
(Continued)

*Primary Examiner* — Dah-Wei D Yuan
*Assistant Examiner* — Kristen A Dagenais
(74) *Attorney, Agent, or Firm* — Fitch, Even, Tabin & Flannery LLP (57) ABSTRACT

The present invention relates to a production method for a product having a cured resin layer with a fine concave-convex structure formed on the surface of a substrate, the method including filling the space between a mold having a fine concave-convex structure composed of anodized alumina on the surface and a substrate with an active energy ray-curable resin composition, and curing the composition by irradiation with active energy rays, thereby forming a cured resin layer into which the fine concave-convex structure has been transferred on the surface of the substrate, wherein (A) the method includes treating the surface of the mold with a release agent, at least at transfer initiation, and (B) the active energy ray-curable resin composition includes a polymerizable compound, a polymerization initiator and a (poly)oxyethylene alkyl phosphate ester compound.

13 Claims, 2 Drawing Sheets

(51) Int. Cl.
*B29C 33/58* (2006.01)
*B29C 39/14* (2006.01)
*B29C 39/18* (2006.01)
*B29C 59/04* (2006.01)
*C08G 65/335* (2006.01)
*C08L 71/02* (2006.01)
*G02B 27/00* (2006.01)
*C09D 171/02* (2006.01)
*B29C 35/08* (2006.01)

(52) U.S. Cl.
CPC ....... *B29C 59/046* (2013.01); *B29C 2035/0827* (2013.01); *B29C 2035/0833* (2013.01); *C08G 65/3353* (2013.01); *C08L 71/02* (2013.01); *G02B 27/0006* (2013.01); *B29K 2995/0093* (2013.01); *C09D 171/02* (2013.01); *C08G 65/3351* (2013.01)

(56) References Cited

U.S. PATENT DOCUMENTS

| | | | | |
|---|---|---|---|---|
| 2007/0159698 | A1* | 7/2007 | Taguchi et al. | 359/586 |
| 2008/0001319 | A1* | 1/2008 | Kadowaki | 264/1.32 |
| 2009/0283937 | A1* | 11/2009 | Kodama et al. | 264/447 |
| 2010/0216905 | A1* | 8/2010 | Kuwamura et al. | 521/170 |

FOREIGN PATENT DOCUMENTS

| | | |
|---|---|---|
| JP | 2007-090574 A | 4/2007 |
| JP | 2007-326367 A | 12/2007 |
| JP | 4154595 B2 | 9/2008 |
| JP | 2009-061628 A | 3/2009 |
| JP | 2010-005841 A | 1/2010 |
| JP | 2011-025683 A | 2/2011 |
| WO | 2008/136241 A | 11/2008 |

OTHER PUBLICATIONS

Written Opinion issued on Jun. 14, 2011 in PCT Appln. PCT/JP2011/057246.

* cited by examiner

ACTIVE ENERGY RAY-CURABLE RESIN COMPOSITION, AND PRODUCTION METHOD FOR PRODUCTS WITH SURFACES OF FINE CONCAVE-CONVEX STRUCTURES

This application is the U.S. National Phase of International Application No. PCT/JP2011/057246 filed Mar. 24, 2011, the complete disclosures of which are incorporated herein by reference, and claims the priority from Japanese Application No. JP 2010-070282 filed Mar. 25, 2010.

TECHNICAL FIELD

The present invention relates to an active energy ray-curable resin composition, and a production method for a product having a fine concave-convex structure on the surface.

Priority is claimed on Japanese Patent Application No. 2010-070282, filed Mar. 25, 2010, the content of which is incorporated herein by reference.

BACKGROUND ART

In recent years, it has been discovered that products having fine concave-convex structures with a period that is not more than the wavelength of visible light on the surface of the product exhibit an anti-reflective effect and a lotus effect and the like. In particular, it is known that a concave-convex structure known as a moth-eye structure, which contains an array of substantially conical convex protrusions, acts as an effective anti-reflective device by continuously increasing the refractive index from the refractive index of air to the refractive index of the material of the product.

In terms of the method used for forming a fine concave-convex structure on the surface of a product, a method in which a liquid active energy ray-curable resin composition is used to fill the space between a mold having a fine concave-convex structure on the surface and a substrate, and the resin composition is then cured by irradiation with active energy rays, thereby forming a cured resin layer into which the fine concave-convex structure has been transferred on the surface of the substrate, is attracting much attention.

Further, as the aforementioned mold, a mold composed of an anodized alumina having two or more fine pores on the surface of an aluminum substrate is garnering much attention due to its ease of production (Patent Document 1).

However, in the aforementioned mold, because the period of the fine pores is at the nanometer level, and the aspect ratio of the pores is also comparatively large, the contact interface between the mold and the active energy ray-curable resin composition increases significantly. As a result, a problem arises in that the mold is difficult to release from the cured resin layer.

The following methods have been proposed as methods of improving the releasability between the mold and the cured resin layer.

(1) A method in which the surface of the mold on which the fine concave-convex structure is formed is treated with a release agent (external release agent) (Patent Document 2).

(2) A method in which instead of using a liquid photocurable resin composition, a solid photocurable transfer layer is used which is composed of a photocurable resin composition containing a phosphate ester-based compound as a lubricant (internal release agent) (Patent Document 3).

However, in the method (1), when the fine concave-convex structure of the mold is repeatedly transferred, the release agent is gradually stripped from the surface of the mold, and the releasability gradually deteriorates. When the releasability deteriorates, productivity of the product decreases, and portions of either the fine concave-convex being transferred or the product can become damaged, meaning the transfer precision also deteriorates.

In the method (2), in the case of particularly fine and deep concave-convex structures, or depending on the material used for the mold, satisfactory releasability may not be obtainable. Further, because the fluidity of the photocurable transfer layer is low, when the mold is pressed against the photocurable transfer layer, heating and/or a large amount of pressure are required, which not only places a considerable load on the mold and the apparatus, but in the case of particularly fine and deep concave-convex structures, makes it difficult to achieve satisfactory transfer precision. Furthermore, the takt time also increases, and the productivity is low.

DOCUMENTS OF RELATED ART

Patent Documents

[Patent Document 1] Japanese Laid-Open Patent Application No. 2005-156695
[Patent Document 2] Japanese Laid-Open Patent Application No. 2007-326367
[Patent Document 3] Japanese Laid-Open Patent Application No. 2009-061628

DISCLOSURE OF INVENTION

Problems to be Solved by the Invention

The present invention provides a production method for a product having a fine concave-convex structure on the surface, which enables the releasability between the mold and the cured resin layer to be maintained over a long period of time, and enables the fine concave-convex structure of the mold to be transferred efficiently and with good precision.

Means to Solve the Problems

An active energy ray-curable resin composition of the present invention is used in a production method that includes filling the space between a mold having a fine concave-convex structure composed of anodized alumina on the surface and a substrate with the active energy ray-curable resin composition, and curing the composition by irradiation with active energy rays, thereby forming a cured resin layer into which the fine concave-convex structure has been transferred on the surface of the substrate, wherein the active energy ray-curable resin composition includes a polymerizable compound, a polymerization initiator and a (poly)oxyethylene alkyl phosphate ester compound, and the viscosity of the composition at 25° C. is not more than 10,000 mPa·s.

The (poly)oxyethylene alkyl phosphate ester compound is preferably a compound represented by a formula (1) shown below.

$$(HO)_{3-n}(O=)P[-O-(CH_2CH_2O)_m-R^1]_n \quad (1)$$

In the formula, $R^1$ represents an alkyl group, m represents an integer of 1 to 20, and n represents an integer of 1 to 3.

The amount of the (poly)oxyethylene alkyl phosphate ester compound is preferably within a range from 0.01 to 0.1 parts by mass, relative to 100 parts by mass of the polymerizable compound.

A production method for a product having a fine concave-convex structure on the surface according to the present invention is a method for producing a product having a cured resin layer with a fine concave-convex structure formed on the surface of a substrate, the method including filling the space between a mold having a fine concave-convex structure composed of anodized alumina on the surface and a substrate with the active energy ray-curable resin composition according to the present invention, and curing the composition by irradiation with active energy rays, thereby forming a cured resin layer into which the fine concave-convex structure has been transferred on the surface of the substrate.

The surface of the mold is preferably treated with a release agent.

In other words, the present invention relates to the aspects described below.

(1) A production method for a product having a cured resin layer with a fine concave-convex structure formed on the surface of a substrate, the method including filling the space between a mold having a fine concave-convex structure composed of anodized alumina on the surface and a substrate with an active energy ray-curable resin composition, and curing the composition by irradiation with active energy rays, thereby forming a cured resin layer into which the fine concave-convex structure has been transferred on the surface of the substrate, wherein (A) the method includes treating the surface of the mold with a release agent, at least at transfer initiation, and (B) the active energy ray-curable resin composition includes a polymerizable compound, a polymerization initiator and a (poly)oxyethylene alkyl phosphate ester compound.

(2) The production method for a product having a cured resin layer with a fine concave-convex structure formed on the surface of a substrate according to (1), wherein the (poly)oxyethylene alkyl phosphate ester compound is a compound represented by a formula (1) shown below:

$$(HO)_{3-n}(O=)P[-O-(CH_2CH_2O)_m-R^1]_n \quad (1)$$

wherein $R^1$ represents an alkyl group, m represents an integer of 1 to 20, and n represents an integer of 1 to 3.

(3) The production method for a product having a cured resin layer with a fine concave-convex structure formed on the surface of a substrate according to (1) or (2), wherein the amount of the (poly)oxyethylene alkyl phosphate ester compound is within a range from 0.01 to 1 part by mass, relative to 100 parts by mass of the polymerizable compound.

Effects of the Invention

The production method for a product having a fine concave-convex structure on the surface according to the present invention enables the releasability between the mold and the cured resin layer to be maintained over a long period of time, and enables the production, with good productivity, of a product having a fine concave-convex structure on the surface that has been transferred with good precision from the fine concave-convex structure of the mold.

EMBODIMENTS OF THE INVENTION

In the present description, the term "(meth)acrylate" means either acrylate or methacrylate. Further, active energy rays refer to visible light rays, ultraviolet rays, an electron beam, a plasma, or heat rays (such as infrared rays) or the like. Furthermore, a "fine concave-convex structure" describes a structure in which the average spacing between convex protrusions or concave recesses (the period) is not more than the wavelength of visible light, namely not more than 400 nm. Moreover, a "(poly)oxyethylene alkyl phosphate ester compound" means an oxyethylene alkyl phosphate ester compound having one oxyethylene group or a polyoxyethylene alkyl phosphate ester compound having two or more oxyethylene groups.

<Active Energy Ray-Curable Resin Composition>

The active energy ray-curable resin composition of the present invention contains a polymerizable compound and a (poly)oxyethylene alkyl phosphate ester compound as an internal release agent.

(Viscosity)

The viscosity of the composition at 25° C. is preferably not more than 10,000 mPa·s, more preferably not more than 5,000 mPa·s, and still more preferably 2,000 mPa·s or less.

The range for the viscosity of the composition at 25° C. is preferably from 5 to 10,000 mPa·s, more preferably from 15 to 5,000 mPa·s, and still more preferably from 30 to 2,000 mPa·s. Provided the viscosity of the composition at 25° C. satisfies the above range, the ability of the composition to conform to the fine concave-convex structure of the mold is improved, and the fine concave-convex structure can be transferred with good precision.

The viscosity of the composition is measured at 25° C. using a rotational E-type viscometer.

(Phosphate Ester Compound)

By including a (poly)oxyethylene alkyl phosphate ester compound, the active energy ray-curable resin composition of the present invention exhibits improved releasability between the mold and the cured resin layer that represents the cured product of the composition. Further, because the load during release is extremely low, damage to the fine concave-convex structure is minimal, and as a result, the fine concave-convex structure of the mold can be transferred efficiently and with good precision.

From the viewpoint of the releasability, the (poly)oxyethylene alkyl phosphate ester compound is preferably a compound represented by the formula (1) shown below.

$$(HO)_{3-n}(O=)P[-O-(CH_2CH_2O)_m-R^1]_n \quad (1)$$

In the formula, $R^1$ represents an alkyl group, m represents an integer of 1 to 20, and n represents an integer of 1 to 3.

$R^1$ is preferably an alkyl group of 1 to 20 carbon atoms, and more preferably an alkyl group of 3 to 18 carbon atoms.

m is preferably an integer of 1 to 10.

Provided the number of carbon atoms within $R^1$ and the value for m satisfy the respective ranges described above, the releasability of the active energy ray-curable resin composition is favorable, and the compatibility with the polymerizable compound improves.

The (poly)oxyethylene alkyl phosphate ester compound may be a monoester (n=1), a diester (n=2) or a triester (n=3). Further, in the case of a diester or triester, the two or more (poly)oxyethylene alkyl groups within each molecule may be different from each other.

Examples of commercially available (poly)oxyethylene alkyl phosphate ester compounds include the products listed below.

JP-506H, manufactured by Johoku Chemical Co., Ltd.,

MoldWiz INT-1856, manufactured by Axel Plastics Research Laboratories, Inc.,

TDP-10, TDP-8, TDP-6, TDP-2, DDP-10, DDP-8, DDP-6, DDP-4, DDP-2, TLP-4, TCP-5 and DLP-10, manufactured by Nikko Chemicals Co., Ltd.

One (poly)oxyethylene alkyl phosphate ester compound may be used individually, or two or more compounds may be used in combination.

The amount of the (poly)oxyethylene alkyl phosphate ester compound is preferably within a range from 0.01 to 1 part by mass, more preferably from 0.05 to 0.5 parts by mass, and still more preferably from 0.05 to 0.1 parts by mass, relative to 100 parts by mass of the polymerizable compound. Provided the amount of the (poly)oxyethylene alkyl phosphate ester compound is not more than 1 part by mass, any deterioration in the performance of the cured resin layer can be suppressed. Further, any deterioration in the adhesion to the substrate is suppressed, and as a result, resin residues on the mold (release defects) and peeling of the cured resin layer from the product can both be suppressed. Provided the amount of the (poly)oxyethylene alkyl phosphate ester compound is at least 0.01 parts by mass, the releasability from the mold is satisfactory, and the occurrence of resin residues on the mold (release defects) can be suppressed.

(Polymerizable Compound)

Examples of the polymerizable compound include monomers, oligomers and reactive polymers having a radical polymerizable bond and/or a cationic polymerizable bond within the molecule.

Examples of monomers having a radical polymerizable bond include monofunctional monomers and polyfunctional monomers.

Specific examples of monofunctional monomers include (meth)acrylate derivatives such as methyl (meth)acrylate, ethyl (meth)acrylate, propyl (meth)acrylate, n-butyl (meth)acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate and 2-ethoxyethyl (meth)acrylate; (meth)acrylic acid and (meth)acrylonitrile; styrene and styrene derivatives such as a-methyl styrene; as well as (meth)acrylamide and (meth)acrylamide derivative such as N-dimethyl (meth)acrylamide, N-diethyl (meth)acrylamide and dimethylaminopropyl (meth)acrylamide. These compounds may be used individually, or two or more compounds may be used in combination.

Specific examples of polyfunctional monomers include difunctional monomers such as ethylene glycol di(meth)acrylate, tripropylene glycol di(meth)acrylate, ethylene oxide isocyanurate-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl) propane, 2,2-bis (4-(meth)acryloxyethoxyphenyl)propane, 2,2-bis(4-(3-(meth)acryloxy-2-hydroxypropoxy)phenyl) propane, 1,2-bis(3-(meth)acryloxy-2-hydroxypropoxy)ethane, 1,4-bis(3-(meth)acryloxy-2-hydroxypropoxy)butane, dimethyloltricyclodecane di(meth)acrylate, bisphenol A ethylene oxide adduct di(meth)acrylate, bisphenol A propylene oxide adduct di(meth)acrylate, neopentyl glycol hydroxypivalate di(meth)acrylate, divinylbenzene and methylenebisacrylamide; trifunctional monomers such as pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate and ethylene oxide isocyanurate-modified tri(meth)acrylate; tetrafunctional or higher monomers such as condensation reaction mixtures of succinic acid/trimethylolethane/acrylic acid, dipentaerythritol hexa(meth)acrylate, dipentaerythritol penta(meth)acrylate, ditrimethylolpropane tetraacrylate and tetramethylolmethane tetra(meth)acrylate; as well as bifunctional or higher urethane acrylates and bifunctional or higher polyester acrylates. These compounds may be used individually, or two or more compounds may be used in combination.

Examples of monomers having a cationic polymerizable bond include monomers having an epoxy group, oxetanyl group, oxazolyl group or vinyloxy group or the like, and monomers having an epoxy group are particularly desirable.

Examples of oligomers or reactive polymers include unsaturated polyesters such as condensation products of an unsaturated dicarboxylic acid and a polyhydric alcohol; as well as polyester (meth)acrylates, polyether (meth)acrylates, polyol (meth)acrylates, epoxy (meth)acrylates, urethane (meth)acrylates, cationic polymerizable epoxy compounds, and homopolymers of copolymers of the aforementioned monomers having a radical polymerizable bond on a side chain.

(Polymerization Initiator)

In those cases where a photocuring reaction is used, examples of the photopolymerization initiator include carbonyl compounds such as benzoin, benzoin methyl ether, benzoin ethyl ether, benzoin isopropyl ether, benzoin isobutyl ether, benzil, benzophenone, p-methoxybenzophenone, 2,2-diethoxyacetophenone, α,α-dimethoxy-α-phenylacetophenone, methyl phenylglyoxylate, ethyl phenylglyoxylate, 4,4'-bis(dimethylamino)benzophenone and 2-hydroxy-2-methyl-1-phenylpropan-1-one; sulfur compounds such as tetramethylthiuram monosulfide and tetramethylthiuram disulfide; as well as 2,4,6-trimethylbenzoyl diphenylphosphine oxide and benzoyl diethoxyphosphine oxide.

These compounds may be used individually, or two or more compounds may be used in combination.

In those cases where an electron beam curing reaction is used, examples of the polymerization initiator include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethyl anthraquinone; thioxanthones such as 2,4-diethylthioxanthone, isopropylthioxanthone and 2,4-dichlorothioxanthone; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one and 2-benzyl-2-dimethylamino-1-(4-morpholinophenyl)butanone; benzoin ethers such as benzoin methyl ether, benzoin ethyl ether, benzoin isopropyl ether and benzoin isobutyl ether; acylphosphine oxides such as 2,4,6-trimethylbenzoyl diphenylphosphine oxide, bis(2,6-dimethoxybenzoyl)-2,4,4-trimethylpentylphosphine oxide and bis(2,4,6-trimethylbenzoyl)-phenylphosphine oxide; as well as methylbenzoyl formate, 1,7-bisacridinylheptane and 9-phenylacridine. These compounds may be used individually, or two or more compounds may be used in combination.

In those cases where a thermal curing reaction is used, examples of the thermal polymerization initiator include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate and lauroyl peroxide; azo compounds such as azobisisobutyronitrile; and redox polymerization initiators obtained by combining an aforementioned organic peroxide with an amine such as N,N-dimethylaniline or N,N-dimethyl-p-toluidine.

The amount of the polymerization initiator is preferably within a range from 0.1 to 10 parts by mass relative to 100 parts by mass of the polymerizable compound. If the amount of the polymerization initiator is less than 0.1 parts by mass, then the polymerization proceeds poorly. If the amount of the polymerization initiator exceeds 10 parts by mass, then the cured film may become discolored and the mechanical strength may deteriorate.

(Other Components)

The active energy ray-curable resin composition may also include, as necessary, additives such as unreactive polymers, active energy ray sol-gel reactive compositions, antistatic agents and fluorine compounds for improving the anti-fouling properties, as well as fine particles and small amounts of solvents.

Examples of the unreactive polymers include acrylic resins, styrene resins, polyurethanes, cellulose resins, polyvinyl butyral, polyesters and thermoplastic elastomers.

Examples of the active energy ray sol-gel reactive compositions include alkoxysilane compounds and alkyl silicate compounds.

Specific examples of the alkoxysilane compounds include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane and trimethylbutoxysilane.

Specific examples of the alkyl silicate compounds include methyl silicate, ethyl silicate, isopropyl silicate, n-propyl silicate, n-butyl silicate, n-pentyl silicate and acetyl silicate.

(Hydrophobic Materials)

In order to generate a water contact angle for the surface of the fine concave-convex structure of the cured resin layer that is at least 90°, it is desirable that a composition containing a fluorine-containing compound or a silicone-based compound is used as the active energy ray-curable resin composition capable of forming a hydrophobic material.

Fluorine-Containing Compound:

Examples of the fluorine-containing compound include fluorine-containing monomers, fluorine-containing silane coupling agents, fluorine-containing surfactants and fluorine-containing polymers.

Examples of the fluorine-containing monomers include fluoroalkyl group-substituted vinyl monomers and fluoroalkyl group-substituted ring-opening polymerizable monomers.

Specific examples of the fluoroalkyl group-substituted vinyl monomers include fluoroalkyl group-substituted (meth)acrylates, fluoroalkyl group-substituted (meth)acrylamides, fluoroalkyl group-substituted vinyl ethers and fluoroalkyl group-substituted styrenes.

Specific examples of the fluoroalkyl group-substituted ring-opening polymerizable monomers include fluoroalkyl group-substituted epoxy compounds, fluoroalkyl group-substituted oxetane compounds and fluoroalkyl group-substituted oxazoline compounds.

Specific examples of the fluorine-containing silane coupling agents include 3,3,3-trifluoropropyltrimethoxysilane, 3,3,3-trifluoropropyltriacetoxysilane, dimethyl-3,3,3-trifluoropropylmethoxysilane and tridecafluoro-1,1,2,2-tetrahydrooctyltriethoxysilane.

Examples of the fluorine-containing surfactants include fluoroalkyl group-containing anionic surfactants and fluoroalkyl group-containing cationic surfactants.

Examples of the fluorine-containing polymers include polymers of fluoroalkyl group-containing monomers, copolymers of fluoroalkyl group-containing monomers and poly(oxyalkylene) group-containing monomers, and copolymers of fluoroalkyl group-containing monomers and cross-linking reactive group-containing monomers. The fluorine-containing polymer may be a copolymer obtained by copolymerization with other copolymerizable monomers.

Silicone-Based Compound:

Examples of the silicone-based compound include (meth)acrylic acid-modified silicones, silicone resins and silicone-based silane coupling agents.

Examples of the (meth)acrylic acid-modified silicones include silicone (di)(meth)acrylates, and for example, products such as the silicone diacrylates x-22-164 and x-22-1602 manufactured by Shin-Etsu Chemical Co., Ltd. can be used favorably.

(Hydrophilic Material)

In order to generate a water contact angle for the surface of the fine concave-convex structure of the cured resin layer that is not more than 25°, it is desirable that a composition containing at least a hydrophilic monomer is used as the active energy ray-curable resin composition capable of forming a hydrophilic material. Furthermore, from the viewpoints of imparting abrasion resistance and water resistance, the composition preferably also includes a cross-linkable polyfunctional monomer. The hydrophilic monomer and the cross-linkable polyfunctional monomer may be the same compound (namely, a hydrophilic polyfunctional monomer). Moreover, the active energy ray-curable resin composition may also include other monomers.

As the active energy ray-curable resin composition capable of forming a hydrophilic material, it is preferable to use a composition containing a tetrafunctional or higher polyfunctional (meth)acrylate, a difunctional or higher hydrophilic (meth)acrylate, and if necessary, a monofunctional monomer.

Examples of the tetrafunctional or higher polyfunctional (meth)acrylate include ditrimethylolpropane tetra(meth)acrylate, pentaerythritol tetra(meth)acrylate, pentaerythritol ethoxy tetra(meth)acrylate, dipentaerythritol hydroxy penta(meth)acrylate, dipentaerythritol hexa(meth)acrylate, a condensation reaction mixture of succinic acid/trimethylolethane/acrylic acid in a 1:2:4 molar ratio, urethane acrylates (such as EBECRYL 220, EBECRYL 1290, EBECRYL 1290K, EBECRYL 5129, EBECRYL 8210, EBECRYL 8301 and KRM 8200, manufactured by Daicel-Cytec Company Ltd.), polyether acrylates (such as EBECRYL 81, manufactured by Daicel-Cytec Company Ltd.), modified epoxy acrylates (such as EBECRYL 3416, manufactured by Daicel-Cytec Company Ltd.), and polyester acrylates (such as EBECRYL 450, EBECRYL 657, EBECRYL 800, EBECRYL 810, EBECRYL 811, EBECRYL 812, EBECRYL 1830, EBECRYL 845, EBECRYL 846 and EBECRYL 1870, manufactured by Daicel-Cytec Company Ltd.). These compounds may be used individually, or two or more compounds may be used in combination.

The tetrafunctional or higher polyfunctional (meth)acrylate is preferably a pentafunctional or higher polyfunctional (meth)acrylate.

The proportion of the tetrafunctional or higher polyfunctional (meth)acrylate is preferably within a range from 40 to 90% by mass, and from the viewpoints of water resistance and chemical resistance, a proportion of 50 to 90% by mass is more preferable, and a proportion of 60 to 80% by mass is particularly desirable. Provided the proportion of the tetrafunctional or higher polyfunctional (meth)acrylate is at least 40% by mass, the elastic modulus increases and the abrasion resistance improves. Provided the proportion of the tetrafunctional or higher polyfunctional (meth)acrylate is not more than 90% by mass, small cracks are unlikely to occur in the surface, and external appearance defects are unlikely.

Examples of the difunctional or higher hydrophilic (meth) acrylate include polyfunctional acrylates having a long-chain polyethylene glycol, such as ARONIX M-240 and ARONIX M-260 (manufactured by Toagosei Co., Ltd.), NK ester AT-20E and NK ester ATM-35E (manufactured by Shin-Nakamura Chemical Co., Ltd.), and polyethylene glycol dimethacrylate. These compounds may be used individually, or two or more compounds may be used in combination.

In the polyethylene glycol dimethacrylate, the total of the average number of repeating units of the polyethylene glycol chain in one molecule is preferably within a range from 6 to 40, more preferably from 9 to 30, and still more preferably from 12 to 20. Provided the average number of repeating units of the polyethylene glycol chain is at least 6, the hydrophilicity is adequate, and the anti-fouling properties improve. Provided the average number of repeating units of the polyethylene glycol chain is not more than 40, compatibility with the tetrafunctional or higher polyfunctional (meth)acrylate is improved, and the active energy ray-curable resin composition is less likely to undergo separation.

The proportion of the difunctional or higher hydrophilic (meth)acrylate is preferably within a range from 30 to 80% by mass, and more preferably from 40 to 70% by mass. Provided the proportion of the difunctional or higher hydrophilic (meth)acrylate is at least 30% by mass, the hydrophilicity is adequate, and the anti-fouling properties improve. Provided the proportion of the difunctional or higher hydrophilic (meth)acrylate is not more than 80% by mass, the elastic modulus increases and the abrasion resistance improves.

The monofunctional monomer is preferably a hydrophilic monofunctional monomer.

Examples of the hydrophilic monofunctional monomer include monofunctional (meth)acrylates having a polyethylene glycol chain in the ester group, such as M-20G, M-90G and M-230G (manufactured by Shin-Nakamura Chemical Co., Ltd.); monofunctional (meth)acrylates having a hydroxyl group in the ester group, such as hydroxyalkyl (meth)acrylates; monofunctional acrylamides; and cationic monomers such as methacrylamidopropyl trimethylammonium methyl sulfate and methacryloyloxyethyl trimethylammonium methyl sulfate.

Further, as the monofunctional monomer, viscosity modifiers such as acryloyl morpholine and vinyl pyrrolidone, and adhesion improvers such as acryloyl isocyanate that improve the adhesion to the main product body, may also be used.

The proportion of the monofunctional monomer is preferably within a range from 0 to 20% by mass, and more preferably from 5 to 15% by mass. Using the monofunctional monomer improves the adhesion between the substrate and the cured resin. Provided the proportion of the monofunctional monomer is not more than 20% by mass, satisfactory anti-fouling properties and abrasion resistance can be realized without overly reducing the amount of the tetrafunctional or higher polyfunctional (meth)acrylate or the difunctional or higher hydrophilic (meth)acrylate.

One or more of the monofunctional monomers may be added to the active energy ray-curable resin composition in an amount of 0 to 35 parts by mass as a (co)polymerized low-polymerization degree polymer. Examples of such low-polymerization degree polymers include copolymerized oligomers (MG polymer, manufactured by MRC Unitec Co., Ltd.) obtained by copolymerization of a monofunctional (meth) acrylate having a polyethylene glycol chain in the ester group, such as M-230G (manufactured by Shin-Nakamura Chemical Co., Ltd.), and methacrylamidopropyl trimethylammonium methyl sulfate in a ratio of 40/60.

(Actions and Effects)

The active energy ray-curable resin composition of the present invention described above contains the (poly)oxyethylene alkyl phosphate ester compound as an internal release agent, and therefore releasability between the mold and the cured resin layer can be maintained over a long period of time. Further, because the viscosity of the composition at 25° C. is not more than 10,000 mPa·s, the fine concave-convex structure of the mold can be transferred efficiently and with good precision.

<Production Method for Product>

The production method for a product having a fine concave-convex structure on the surface according to the present invention includes: filling the space between a mold having a fine concave-convex structure composed of anodized alumina on the surface and a substrate with the active energy ray-curable resin composition of the present invention, curing the composition by irradiation with active energy rays, thereby forming a cured resin layer into which the fine concave-convex structure has been transferred on the surface of the substrate, and releasing the substrate having the cured resin layer formed on the surface from the mold.

(Substrate)

Examples of the form of the substrate include films, sheets, injection molded items and press molded items.

Examples of the material of the substrate include polycarbonates, polystyrene resins, polyesters, acrylic resins, cellulose resins (such as triacetylcellulose), polyolefins and glass.

(Mold)

The mold can be produced, for example, using a method having steps (I) and (II) described below.

(I) A step of forming an anodized alumina having two or more fine pores (concave recesses) on the surface of an aluminum substrate, thus preparing the mold main body.

(II) Following step (I), a step of treating the surface of the mold main body on which the fine concave-convex structure has been formed with a release agent.

In the step (I), an anodized alumina having two or more fine pores (concave recesses) is formed on the surface of an aluminum substrate.

The method for preparing the mold main body is preferably a method that includes steps (a) to (I) described below.

(a) A step of forming an oxidized coating on the surface of an aluminum substrate by anodizing the aluminum substrate in an electrolyte under constant voltage.

(b) A step of removing the oxidized coating, and forming anodized fine pore-generating points on the surface of the aluminum substrate.

(c) A step of forming an oxidized coating having fine pores at the fine pore-generating points by re-anodizing the aluminum substrate in an electrolyte.

(d) A step of enlarging the diameter of the fine pores.

(e) Following the step (d), a step of once again performing anodization in an electrolyte.

(f) A step of repeating the steps (d) and (e) to obtain a mold main body composed of an anodized alumina having two or more fine pores formed on the surface of the aluminum substrate.

Figure 1:
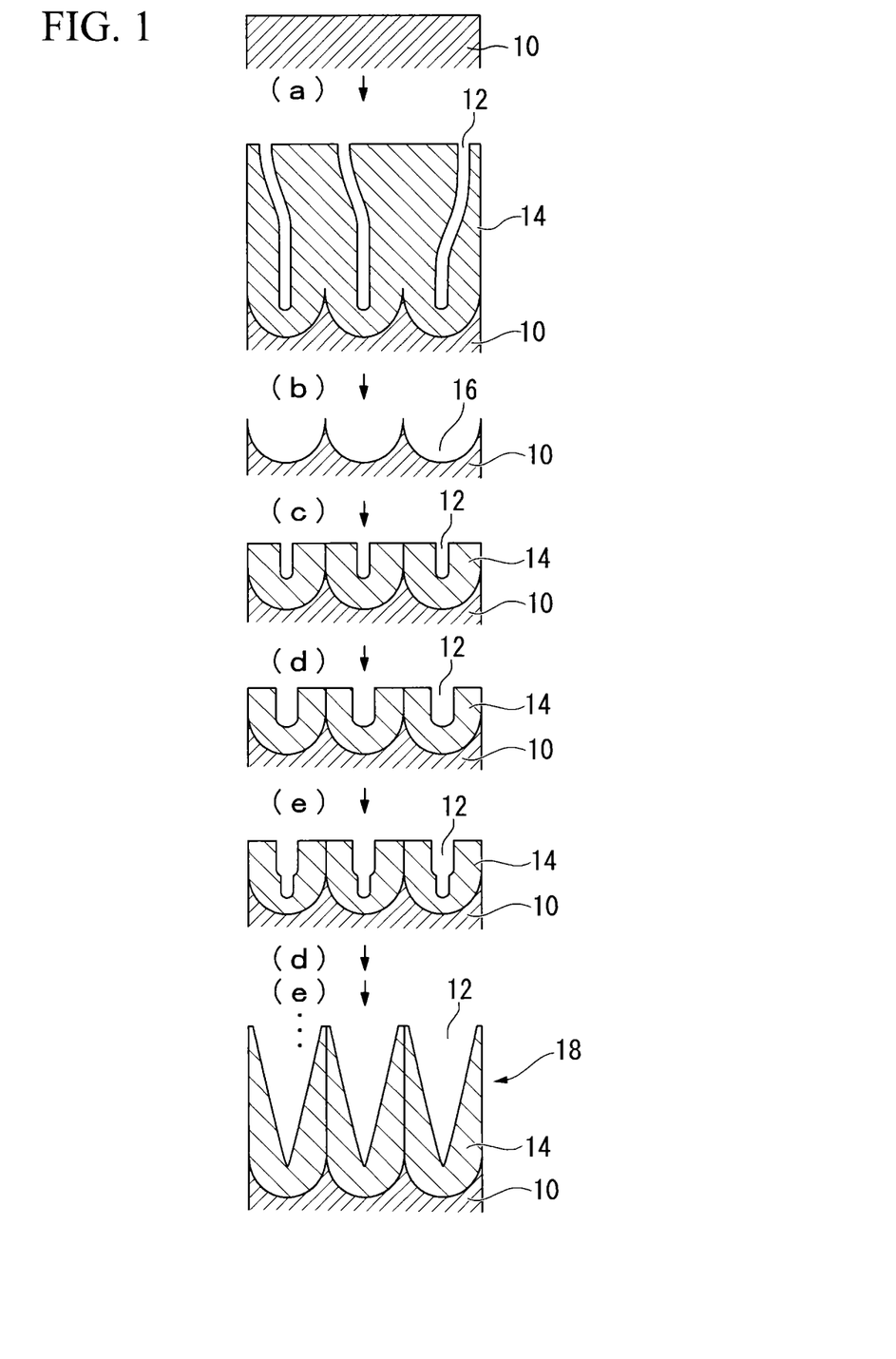
FIG. 1 is a cross-sectional view illustrating the production steps for a mold having an anodized alumina on the surface.

Step (a):

As illustrated in FIG. 1, when an aluminum substrate 10 is anodized, an oxidized coating 14 having fine pores 12 is formed.

Examples of the shape of the aluminum substrate include rolled shapes, cylindrical shapes, flat plate shapes and sheets.

Further, in order to smooth the surface state, the aluminum substrate is preferably polished by mechanical polishing, fabric polishing, chemical polishing or an electrolytic polishing treatment (etching treatment). Furthermore, because the aluminum substrate typically has oil adhered to the surface from the processing used to produce the prescribed shape, a degreasing treatment is preferably performed prior to the anodization.

The purity of the aluminum is preferably at least 99%, more preferably 99.5% or higher, and most preferably 99.8% or higher. If the purity of the aluminum is low, then during anodization, a concave-convex structure of a size that scatters visible light may be formed due to the segregation of impurities, or the regularity of the fine pores obtained by the anodization may deteriorate.

Examples of the electrolyte include sulfuric acid, oxalic acid and phosphoric acid.

The Case where Oxalic Acid is used as the Electrolyte:

The concentration of the oxalic acid is preferably 0.7 M or lower. If the concentration of the oxalic acid exceeds 0.7 M, then the current value becomes too high, and the surface of the oxidized coating may become rough.

When the formation voltage is within a range from 30 to 60 V, an anodized alumina having fine pores of high regularity with an average spacing between pores of 100 nm can be obtained. The regularity tends to decrease if the formation voltage is higher or lower than this range.

The temperature of the electrolyte is preferably not more than 60° C., and more preferably 45° C. or lower. If the temperature of the electrolyte exceeds 60° C., then a so-called "scorching" phenomenon occurs, wherein the fine pores are destroyed or the regularity of the fine pores deteriorates due to melting of the surface.

The Case where Sulfuric Acid is used as the Electrolyte:

The concentration of the sulfuric acid is preferably 0.7 M or lower. If the concentration of the sulfuric acid exceeds 0.7 M, then the current value becomes too high, and a constant voltage may not be able to be maintained.

When the formation voltage is within a range from 25 to 30 V, an anodized alumina having fine pores of high regularity with an average spacing between pores of 63 nm can be obtained. The regularity tends to decrease if the formation voltage is higher or lower than this range.

The temperature of the electrolyte is preferably not more than 30° C., and more preferably 20° C. or lower. If the temperature of the electrolyte exceeds 30° C., then a so-called "scorching" phenomenon occurs, wherein the fine pores are destroyed or the regularity of the fine pores deteriorates due to melting of the surface.

Step (b):

As illustrated in FIG. 1, by temporarily removing the oxidized coating 14 and forming anodized fine pore-generating points 16, the regularity of the fine pores can be improved.

An example of the method used for removing the oxidized coating is a method that involves dissolving the oxidized coating in a solution that selectively dissolves the oxidized coating while not dissolving the aluminum. An example of this solution is a mixed solution of chromic acid and phosphoric acid.

Step (c):

As illustrated in FIG. 1, when the aluminum substrate 10 from which the oxidized coating has been removed is subjected to a second anodization, an oxidized coating 14 having cylindrical fine pores 12 is formed.

The anodization may be performed under the same conditions as the step (a). By lengthening the time of the anodization treatment, deeper fine pores can be obtained.

Step (d):

As illustrated in FIG. 1, a treatment for enlarging the diameter of the fine pores 12 (hereafter referred to as the "fine pore diameter-enlarging treatment") is performed. The fine pore diameter-enlarging treatment is a treatment in which the diameters of the fine pores obtained by anodization are enlarged by dipping the oxidized coating in a solution capable of dissolving the oxidized coating. An example of the solution is an aqueous phosphoric acid solution with a concentration of approximately 5% by mass.

By lengthening the time of the fine pore diameter-enlarging treatment, the diameter of the fine pores can be increased.

Step (e):

As illustrated in FIG. 1, by once again performing an anodization treatment, fine pores 12 having a narrow-diameter cylindrical shape are formed, which extend downward from the bottom of the cylindrical fine pores 12.

The anodization may be performed under the same conditions as the step (a). By lengthening the time of the anodization treatment, deeper fine pores can be obtained.

Step (f):

As illustrated in FIG. 1, by repeating the fine pore diameter-enlarging treatment of the step (d) and the anodization of the step (e), an oxidized coating 14 is formed which has fine pores 12 with a shape that continuously decreases in the depth direction from the pore opening, thus obtaining a mold main body 18 having an anodized alumina (a porous oxidized coating of aluminum (alumite)) on the surface of the aluminum substrate 10. The process is preferably ended at the step (d).

The number of repetitions preferably totals at least 3, and is more preferably 5 or more. If the number of repetitions is 2 or less, then the diameter of the fine pores tends to decrease in a non-continuous manner, meaning the anti-reflective effect of the moth-eye structure formed using the anodized alumina having the fine pores may be unsatisfactory.

Examples of the shape of the fine pores 12 include substantially conical shapes, pyramidal shapes and circular cylindrical shapes, but shapes such as substantially conical shapes and pyramidal shapes, in which the pore cross-section in a direction orthogonal to the depth direction decreases continuously in the depth direction from the uppermost surface, are preferred.

The average spacing between the fine pores 12 is not more than the wavelength of visible light, namely not more than 400 nm. The average spacing between the fine pores 12 is preferably at least 20 nm.

The range for the average spacing between the fine pores 12 is preferably at least 20 nm but not more than 400 nm, more preferably at least 50 nm but not more than 300 nm, and still more preferably at least 90 nm but not more than 250 nm.

The average spacing between the fine pores 12 is determined by using electron microscope observation to measure the spacing between adjacent fine pores 12 (namely, the distance from the center of a fine pore 12 to the center of the adjacent fine pore 12) at 10 different locations, and then calculating the average of the measured values.

The depth of the fine pores 12, in the case of an average spacing of 100 nm, is preferably within a range from 80 to 500 nm, more preferably from 120 to 400 nm, and still more preferably from 150 to 300 nm.

The depth of the fine pores 12 is determined by electron microscope observation at a magnification of 30,000×, and is the value obtained by measuring the distance from the lowest depth of the fine pore 12 to the highest peak of the convex protrusions that exists between the fine pores 12.

The aspect ratio of the fine pores 12 (depth of fine pores/average spacing between fine pores) is preferably within a range from 0.8 to 5.0, more preferably from 1.2 to 4.0, and most preferably from 1.5 to 3.0.

In the step (II), the surface of the mold main body on which the fine concave-convex structure has been formed is treated with a release agent.

The release agent is preferably a compound having a functional group that can form a chemical bond with the anodized alumina of the aluminum substrate.

<Release Agent>

By treating the mold surface of the present invention in advance with a release agent, the initial releasability, in particular, can be improved.

Examples of the release agent include silicone resins, fluororesins and fluorine compounds, and a compound having a functional group that can form a chemical bond with the anodized alumina is preferred, a fluorine compound having a hydrolyzable silyl group is more preferred, and a fluorine compound having a hydrolyzable silyl group and a perfluoropolyether structure is particularly desirable. Examples of commercially available release agents include fluoroalkylsilanes, KBM-7803 (manufactured by Shin-Etsu Chemical Co., Ltd.), MRAF (manufactured by Asahi Glass Co., Ltd.), DURASURF (a registered trademark) HD-1100 and 2100 series (manufactured by Daikin Industries, Ltd.), OPTOOL (a registered trademark) DSX and OPTOOL (a registered trademark) AES4 and AES6 (manufactured by Daikin Industries, Ltd.), NOVEC EGG-1720 (manufactured by Sumitomo 3M Ltd.), and the FS-2050 series (manufactured by Fluoro Technology Co., Ltd.).

Examples of the treatment method using the release agent include methods (II-1) and (II-2) described below, and from the viewpoint of enabling the surface of the mold main body on which the fine concave-convex structure is formed to be treated by the release agent with no unevenness, the method (II-1) is particularly desirable.

(II-1) A method in which the mold main body is dipped in a dilute solution of the release agent.

(II-2) A method in which the release agent or a dilute solution thereof is applied to the surface of the mold main body on which the fine concave-convex structure is formed.

The method (II-1) is preferably a method that includes steps (g) to (l) described below.

(g) A step of washing the mold main body with water.

(h) Following the step (g), a step of blowing air onto the mold main body to remove water droplets adhered to the surface of the mold main body.

(i) A step of dipping the mold main body in a dilute solution containing a fluorine compound having a hydrolyzable silyl group diluted with a fluorine-based solvent.

(j) A step of slowly pulling the dipped mold main body out of the solution.

(k) Where necessary, a step of subjecting the mold main body to a heat and humidity treatment after the step (j).

(l) A step of drying the mold main body.

Step (g):

Because chemical agents used during the formation of the fine concave-convex structure (such as the phosphoric acid aqueous solution used in the fine pore diameter-enlarging treatment) and impurities (such as dust) tend to be adhered to the mold main body, these are removed by washing with water.

Step (h):

If water droplets remain adhered to the surface of the mold main body, then the diluted solution used in the step (i) may degrade, and therefore air is blown onto the mold main body to remove substantially all visible water droplets.

Step (i):

Examples of the fluorine-based solvent used for the dilution include hydrofluoropolyether, perfluorohexane, perfluoromethylcyclohexane, perfluoro-1,3-dimethylcyclohexane and dichloropentafluoropropane.

The concentration of the fluorine compound having a hydrolyzable silyl group within the dilution solvent (100% by mass) is preferably within a range from 0.01 to 0.5% by mass.

The dipping time is preferably from 1 to 30 minutes.

The dipping temperature is preferably from 0 to 50° C.

Step (j):

When pulling the dipped mold main body out of the solution, an electrically operated pulling device or the like is preferably used to pull the mold main body at a constant speed, thereby suppressing vibration during the pulling process. This enables application unevenness to be minimized.

The pulling speed is preferably from 1 to 10 mm/second.

Step (k):

The mold main body may be subjected to a heat and humidity treatment after the step (j). By leaving the mold main body to stand under conditions of heat and humidity, the hydrolyzable silyl group of the fluorine compound (release agent) hydrolyzes to generate a silanol group, and the reaction between this silanol group and a hydroxyl group on the surface of mold main body is able to progress satisfactorily, thus improving the fixing properties of the fluorine compound. Possible humidification methods include a saturated salt method using a saturated salt aqueous solution, a method of performing humidification by heating water, and a method of blowing heated steam directly onto the mold main body. This step may be performed inside a thermo-hygrostat.

The heating temperature is preferably from 30 to 150° C.

The humidification conditions preferably include a relative humidity of at least 60%.

The treatment time is preferably from 10 minutes to 7 days.

Step (l):

In the step of drying the mold main body, the mold main body may be air-dried, or may be subjected to forced heated drying using a dryer or the like.

The drying temperature is preferably from 30 to 150° C.

The drying time is preferably from 5 to 300 minutes.

The treatment of the surface of the mold main body with the release agent can be confirmed by measuring the water contact angle of the surface of the mold main body. The water contact angle of the surface of the mold main body following treatment with the release agent is preferably at least 60°, and more preferably 90° or greater.

The range for the water contact angle is preferably at least 60° but not more than 180°, and more preferably at least 90° but not more than 180°. Provided the water contact angle satisfies the this range, the surface of the mold main body has been adequately treated with the release agent, and the releasability will be favorable.

By treating the surface of the mold main body on which the fine concave-convex structure is formed with a release agent capable of forming a chemical bond with the mold, the initial releasability is improved when the fine concave-convex structure of the mold is transferred to the surface of a product. Further, even when the transfer is performed repeatedly, the releasability is resistant to deterioration, and therefore a product having a fine concave-convex structure on the surface can be produced with good productivity.

(Production Apparatus)

Figure 2:
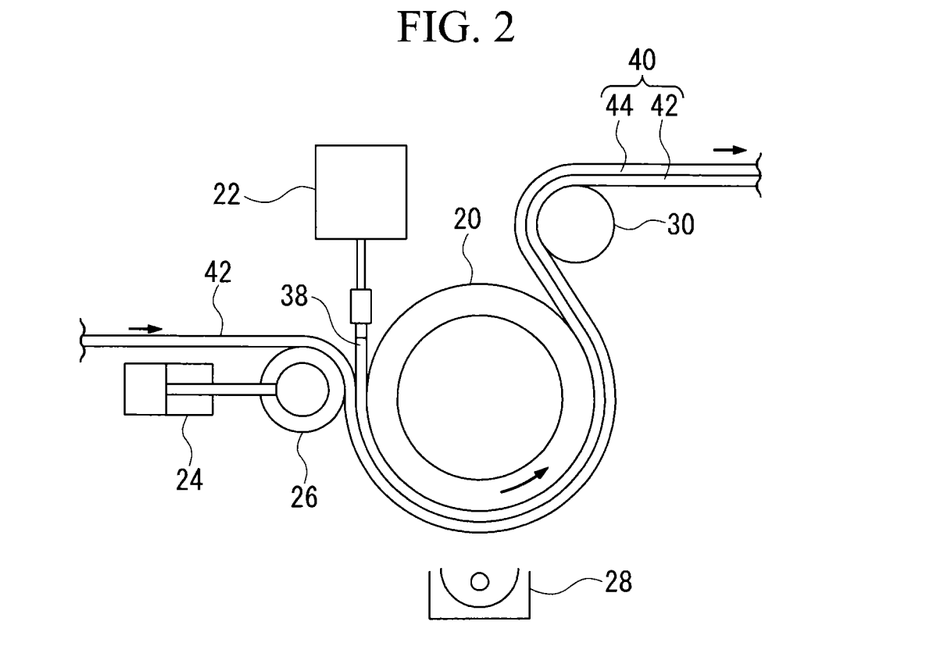
FIG. 2 is a structural diagram illustrating one example of a production apparatus for a product having a fine concave-convex structure on the surface.

The product having a fine concave-convex structure on the surface is produced, for example, using a production apparatus illustrated in FIG. 2, in the manner described below.

An active energy ray-curable resin composition 38 is supplied from a tank 22 to a space between a roll-shaped mold 20 having a fine concave-convex structure (not shown in the drawing) on the surface, and a belt-shaped film 42 (substrate) that moves around the surface of the roll-shaped mold 20.

The film 42 and the active energy ray-curable resin composition 38 are nipped between the roll-shaped mold 20 and a nip roller 26, with the nip pressure being adjusted using a pneumatic cylinder 24, so that the active energy ray-curable resin composition 38 is able to flow uniformly through the space between the film 42 and the roll-shaped mold 20, while filling the concave recesses of the fine concave-convex structure on the roll-shaped mold 20.

By irradiating active energy rays onto the active energy ray-curable resin composition 38 through the film 42, using an active energy ray irradiation device 28 positioned beneath the roll-shaped mold 20, thereby curing the active energy ray-curable resin composition 38, a cured resin layer 44 is formed onto which the fine concave-convex structure from the surface of the roll-shaped mold 20 has been transferred.

Figure 3:
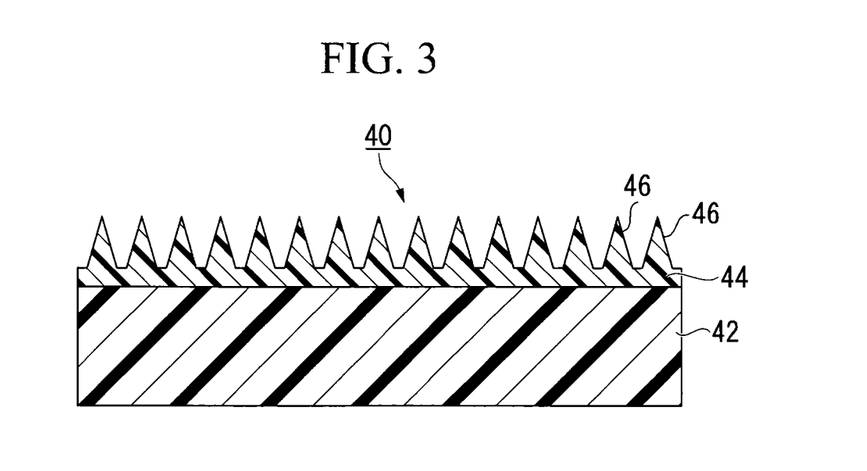
FIG. 3 is a cross-sectional view illustrating one example of a product having a fine concave-convex structure on the surface.

A release roller 30 peels the film 42, which has the cured resin layer 44 formed on the surface, from the roll-shaped mold 20, thus obtaining the type of product 40 illustrated in FIG. 3.

The active energy ray irradiation device 28 is preferably a high-pressure mercury lamp, metal halide lamp or fusion lamp or the like, and in such cases, the amount of irradiated energy is preferably within a range from 100 to 10,000 mJ/cm$^2$.

(Product)

FIG. 3 is a cross-sectional view illustrating one example of the product 40 having a fine concave-convex structure on the surface.

The film 42 is a light transmissive film. Examples of the film material include polycarbonates, polystyrene resins, polyesters, polyurethanes, acrylic resins, polyethersulfones, polysulfones, polyetherketones, cellulose resins (such as triacetylcellulose), polyolefins and alicyclic polyolefins.

The cured resin layer 44 is a film formed from the cured product of the active energy ray-curable resin composition of the present invention, and has a fine concave-convex structure on the surface.

When an anodized alumina mold is used, the fine concave-convex structure on the surface of the product 40 is formed by transfer of the fine concave-convex structure from the surface of the anodized alumina, and is a structure having two or more convex protrusions 46 formed from the cured product of the active energy ray-curable resin composition.

The fine concave-convex structure is preferably a so-called moth-eye structure which contains an array of at least two substantially conical or pyramidal protrusions (convex portions). In a moth-eye structure in which the spacing between the protrusions is not more than the wavelength of visible light, the refractive index increases continuously from the refractive index of air to the refractive index of the material of the product, thus providing an effective anti-reflective action.

The average spacing between the convex protrusions is typically not more than the wavelength of visible light, namely not more than 400 nm. When the convex protrusions are formed using an anodized alumina mold, the average spacing between the convex protrusions is typically from approximately 100 to 200 nm, and therefore a value of not more than 250 nm is particularly desirable.

From the viewpoint of ease of formation of the convex protrusions, the average spacing between the convex protrusions is preferably at least 20 nm.

The range for the average spacing between the convex protrusions is preferably from 20 to 400 nm, more preferably from 50 to 300 nm, and still more preferably from 90 to 250 nm.

The average spacing between the convex protrusions is determined by using electron microscope observation to measure the spacing between adjacent convex protrusions (namely, the distance from the center of one convex protrusion to the center of the adjacent convex protrusion) at 10 different locations, and then calculating the average of the measured values.

When the average spacing is 100 nm, the average height of the convex protrusions is preferably within a range from 80 to 500 nm, more preferably from 120 to 400 nm, and most preferably from 150 to 300 nm. Provided the height of the convex protrusions is at least 80 nm, reflectance can be reduced satisfactorily, and the wavelength dependency of the reflectance is minimal. Provided the height of the convex protrusions is not more than 500 nm, the abrasion resistance of the convex protrusions is favorable.

The height of the convex protrusions is determined by electron microscope observation at a magnification of 30,000×, and is the value obtained by measuring the distance from the highest peak of a convex protrusion to the lowest depth of the concave recesses that exist between the convex protrusions.

The aspect ratio of the convex protrusions (height of convex protrusion/average spacing between convex protrusions) is preferably within a range from 0.8 to 5.0, more preferably from 1.2 to 4.0, and most preferably from 1.5 to 3.0. Provided the aspect ratio of the convex protrusions is at least 1.0, the reflectance can be reduced satisfactorily. Provided the aspect ratio of the convex protrusions is not more than 5.0, abrasion resistance of the convex protrusions is favorable.

The shape of the convex protrusions is preferably a shape in which the cross-section of the convex protrusion in a direction orthogonal to the height direction increases continuously in the depth direction from the uppermost surface, namely a shape in which the cross-sectional shape of the convex protrusion in the height direction is a triangular, trapezoidal or bell shape or the like.

The difference between the refractive index of the cured resin layer 44 and the refractive index of the film 42 is preferably not more than 0.2, more preferably not more than 0.1, and most preferably 0.05 or less. Provided this difference in the refractive indices is not more than 0.2, reflection at the interface between the cured resin layer 44 and the film 42 can be suppressed.

When a surface has a fine concave-convex structure, it is known that if the surface is formed from a hydrophobic material, then super water repellency is obtained due to the lotus effect, whereas if the surface is formed from a hydrophilic material, superhydrophilicity is obtained.

When the material of the cured resin layer 44 is hydrophobic, the water contact angle of the surface of the fine concave-convex structure is preferably at least 90°, more preferably at least 110°, and most preferably at least 120°. Provided the water contact angle is at least 90°, water soiling is unlikely to adhere to the surface and satisfactory anti-fouling properties are achieved. Further, because water is unlikely to adhere to the surface, an anti-icing effect can be expected.

When the material of the cured resin layer 44 is hydrophobic, the range for the water contact angle of the surface of the fine concave-convex structure is preferably at least 90° but not more than 180°, more preferably at least 110° but not more than 180°, and most preferably at least 120° but not more than 180°.

When the material of the cured resin layer 44 is hydrophilic, the water contact angle of the surface of the fine concave-convex structure is preferably not more than 25°, more preferably not more than 23°, and most preferably 21° or less. Provided the water contact angle is not more than 25°, any soiling adhered to the surface can be washed off with water, and because oil-based soling is unlikely to adhere, satisfactory anti-fouling properties can be achieved. In terms of suppressing deformation of the fine concave-convex structure caused by water absorption by the cured resin layer 44, and the associated increase in the reflectance, the water contact angle is preferably at least 3°.

When the material of the cured resin layer 44 is hydrophilic, the range for the water contact angle of the surface of the fine concave-convex structure is preferably at least 3° but not more than 30°, more preferably at least 3° but not more than 23°, and most preferably at least 3° but not more than 21°.

(Uses)

Examples of potential uses for the product 40 include anti-reflective products, anti-fogging products, anti-fouling products and water repellent products, and more specific examples include anti-reflective films for displays, automobile meter covers, automobile mirrors, automobile windows, light extraction efficiency improvement members for organic and inorganic electroluminescent devices, and solar cell members.

(Actions and Effects)

In the production method for a product having a cured resin layer with a fine concave-convex structure formed on the surface of a substrate according to the present invention, because the mold surface is treated in advance with a release agent, and because the (poly)oxyethylene alkyl phosphate ester compound is included as an internal release agent, the releasability between the mold and the cured resin layer can be maintained over a long period of time, and the fine concave-convex structure of the mold can be transferred efficiently and with good precision.

EXAMPLES

The present invention is described below in further detail using a series of examples, but the present invention is in no way limited by these examples.

(Viscosity)

The viscosity of the active energy ray-curable resin compositions was measured at 25° C. using a rotational E-type viscometer (RE-80R, manufactured by Toki Sanyo Co., Ltd.).

(Fine Pores of Anodized Alumina)

A portion of the anodized alumina was scraped away, platinum was vapor-deposited onto the cross-section for 1 minute, the fine pores were then inspected using a field emission scanning electron microscope (JSM-7400F, manufactured by JEOL, Ltd.) under conditions including an accelerating voltage of 3.00 kV, and the spacing between the fine pores and the depth of the pores were measured. Each measurement was performed 10 times, and the respective average values were determined.

(Shape of Convex Protrusions)

Platinum was vapor-deposited onto a fractured cross-section of the fine concave-convex structure of the product for 5 minutes, the cross-section was inspected in the same manner as that described for the mold, and the spacing between convex protrusions and the height of the protrusions were measured. Each measurement was performed 10 times, and the respective average values were determined.

(Peel Force)

During release from the mold in the transfer test described below, a 90° peel test was performed in accordance with JIS Z0237, with the mold acting as the adherend and the cured resin and the substrate acting as the pressure-sensitive adhesive tape, and the peel strength during release from the mold was measured. Measurements were performed from the first transfer through to the 1,000th transfer, and in those cases where the peel strength became excessively large prior to the 1,000th transfer, or resin residues were left on the mold, the peel strength was measured at that point.

When the peel strength is large, namely when a large force is required during mold release, if the peel strength exceeds the adhesive force between the substrate and the resin, then some resin will be left on the mold. Further, because a large stress is placed on the substrate and the cured resin, cracking in the cured resin portion and deformation (elongation) or rupture of the substrate become more likely, both of which are undesirable. Further, release of the resin from the concave recess structures becomes more difficult, meaning deterioration in the pattern precision becomes increasingly likely.

In other words, in nanoimprinting, it is desirable that the peel strength can be maintained at a low level even after repeated transfers.

(Resin Residues)

Resin residue describes the state where, during release from the mold of the cured resin pattern that is adhered to the substrate, the cured resin adheres to the surface of the mold, meaning all or some of the mold pattern is unable to be transferred. When adhered resin was confirmed in at least 10% (by surface area) of the transfer region that was filled with the cured resin, a result of "resin residue" (B) was recorded. Further, when less than 10% of the transfer region contained adhered resin, a result of "no resin residue" (A) was recorded.

(Transfer Test)

10 μL of the active energy ray-curable resin composition was added dropwise to the surface of the mold on which the fine concave-convex structure was formed, and following coating with a polyethylene terephthalate (hereafter abbreviated as "PET") film, a load of 50 N was applied, and curing was performed using an UV irradiation device (high-pressure mercury lamp, integral of light: 1,100 mJ/cm$^2$). Subsequently, the cured resin layer was peeled, together with the PET film, from the mold, thereby transferring the fine concave-convex structure to the surface of the PET film and forming a product.

(Water Contact Angle)

Using a contact angle measurement device (DSA10-Mk2, manufactured by Kruss GmbH), 2 μL of water was dripped onto the surface of the mold main body on which the fine concave-convex structure was formed, the water contact angle was measured 10 seconds after the water had been dripped and then at one second intervals until 10 measurements had been made, and the average value of the measurements was determined. Moreover, the location onto which the water was dripped was altered and the same series of operations was repeated a further three times, and the thus obtained 4 average values were then averaged.

(Weighted Average Reflectance)

A sample was prepared by roughening the surface of the product on which the fine concave-convex structure was not formed, and then painting the roughened surface a matt black color. Using a spectrophotometer (U-4000, manufactured by Hitachi, Ltd.), the relative reflectance of the surface of the cured resin layer of the sample was measured at an incident angle of 5° across a wavelength range from 380 to 780 nm, and the weighted average reflectance was calculated in accordance with JIS 83106. A weighted average reflectance of not more than 0.6% indicates that the fine concave-convex structure has been formed favorably with excellent transfer precision.

(Substrate Adhesion: 180° Peel Test)

The active energy ray-curable resin composition was applied between two PET films, and subsequently cured using an UV irradiation device (high-pressure mercury lamp, integral of light: 1,100 mJ/cm$^2$). The thus obtained laminated film having a 3-layer structure was cut into strips (approximately 20×80 mm, resin portion approximately 20×50 mm), and a 180° peel test was used to evaluate the peel strength between the cured resin and the PET substrate.

Preparation Examples

Components were mixed together in the proportions listed below to prepare active energy ray-curable resin compositions A, B and C.

(Active Energy Ray-Curable Resin Composition A: Hydrophobic Curable Liquid, Viscosity: 80 mPa·s)

TAS: condensation reaction mixture of succinic acid/trimethylolethane/acrylic acid in a 1:2:4 molar ratio; 45 parts by mass, C6DA: 1,6-hexanediol diacrylate (manufactured by Osaka Organic Chemical Industry Ltd.); 45 parts by mass, X-22-1602: radical polymerizable silicone oil (manufactured by Shin-Etsu Chemical Co., Ltd.); 10 parts by mass, Irg184: 1-hydroxycyclohexyl phenyl ketone (IRGACURE 184, manufactured by Ciba Specialty Chemicals Inc.); 1.0 parts by mass, Irg819: bis(2,4,6-trimethylbenzoyl)-phenylphosphine oxide (IRGACURE 819, manufactured by Ciba Specialty Chemicals Inc.); 0.2 parts by mass.

(Active Energy Ray-Curable Resin Composition B: Hydrophilic Curable Liquid, Viscosity: 320 mPa·s)

TAS: condensation reaction mixture of succinic acid/trimethylolethane/acrylic acid in a 1:2:4 molar ratio; 65 parts by mass, M260: polyethylene glycol diacrylate, n=13 to 14 (ARONIX M260, manufactured by Toagosei Co., Ltd.); 30 parts by mass, MA: methyl acrylate; 5 parts by mass, Irg184: 1-hydroxycyclohexyl phenyl ketone (IRGACURE 184, manufactured by Ciba Specialty Chemicals Inc.); 1 part by mass, Irg819: bis(2,4,6-trimethylbenzoyl)-phenylphosphine oxide (IRGACURE 819, manufactured by Ciba Specialty Chemicals Inc.); 0.1 parts by mass.

(Active Energy Ray-Curable Resin Composition C: Hydrophobic Curable Liquid, Viscosity: 170 mPa·s)

ATM-4E: ethoxylated pentaerythritol tetraacrylate (manufactured by Shin-Nakamura Chemical Co., Ltd.); 80 parts by mass, X-22-1602: radical polymerizable silicone oil (manufactured by Shin-Etsu Chemical Co., Ltd.); 15 parts by mass, HEA: 2-hydroxyethyl acrylate; 5 parts by mass, Irg184: 1-hydroxycyclohexyl phenyl ketone (IRGACURE 184, manufactured by Ciba Specialty Chemicals Inc.); 0.5 parts by mass, DAROCURE TPO: 2,4,6-trimethylbenzoyl diphenylphosphine oxide (manufactured by Ciba Specialty Chemicals Inc.); 0.5 parts by mass.

Production Examples

An aluminum sheet (purity: 99.99%) having dimensions of 50 mm×50 mm×thickness 0.3 mm was subjected to electrolytic polishing in a mixed solution of perchloric acid and ethanol (1/4 volumetric ratio).

Step (a):

The aluminum sheet was anodized for 6 hours in a 0.3 M oxalic acid aqueous solution under conditions including a direct current of 40 V and a temperature of 16° C.

Step (b):

The aluminum sheet having the oxidized coating formed thereon was dipped for 3 hours in a mixed aqueous solution containing 6% by mass of phosphoric acid and 1.8% by mass of chromic acid to remove the oxidized coating.

Step (c):

The aluminum sheet was anodized for 30 seconds in a 0.3 M oxalic acid aqueous solution under conditions including a direct current of 40 V and a temperature of 16° C.

Step (d):

The aluminum sheet having the oxidized coating formed thereon was subjected to a fine pore diameter-enlarging treatment by dipping for 8 minutes in a 32° C. aqueous solution containing 5% by mass of phosphoric acid.

Step (e):

The aluminum sheet was anodized for 30 seconds in a 0.3 M oxalic acid aqueous solution under conditions including a direct current of 40 V and a temperature of 16° C.

Step (f):

The steps (d) and (e) were each performed a total of 5 times, yielding a mold main body a in which an anodized alumina having substantially conical-shaped fine pores with a spacing between pores (average period) of 100 nm and a depth of 230 nm had been formed on the surface of the mold main body.

Step (g):

Residual phosphoric acid aqueous solution on the surface of the mold main body a was washed gently away using a shower, and the mold main body a was then dipped in flowing water for 10 minutes.

Step (h):

Air from an air gun was blown onto the mold main body a to remove water droplets adhered to the surface of the mold main body a.

Step (i):

The mold main body a was dipped for 10 minutes at room temperature in a solution prepared by diluting OPTOOL DSX (manufactured by Daikin Industries, Ltd.) to a concentration of 0.1% by mass with a diluent HD-ZV (manufactured by Harves Co., Ltd.).

Step (j):

The mold main body a was pulled slowly out of the dilute solution at a speed of 3 mm/second.

Step (k):

The mold main body a was air-dried overnight, yielding a mold that been treated with a release agent.

The water contact angle of the surface of the mold on which the fine concave-convex structure was formed was approximately 155°.

Example 1

A transfer test was conducted and the releasability was evaluated using the active energy ray-curable resin composition A to which 0.1 parts by mass of TLP-4 (manufactured by Nikko Chemicals Co., Ltd., a compound of the above formula (1) in which $R^1$ is an alkyl group of 12 carbon atoms, n=3 and m=4) had been added per 100 parts by mass of the polymerizable compounds, and the mold obtained in the production example. The weighted average reflectance of the resulting product was also measured. The results are shown in Table 1.

Example 2

With the exception of replacing the TLP-4 with TDP-10 (manufactured by Nikko Chemicals Co., Ltd., a compound of the above formula (1) in which $R^1$ is an alkyl group of 12 to 15 carbon atoms, n=3 and m=10), the releasability was evaluated in the same manner as the example 1. Further, the weighted average reflectance of the resulting product was also measured. The results are shown in Table 1.

Example 3

With the exception of replacing the TLP-4 with TDP-2 (manufactured by Nikko Chemicals Co., Ltd., a compound of the above formula (1) in which $R^1$ is an alkyl group of 12 to 15 carbon atoms, n=3 and m=2), the releasability was evaluated in the same manner as the example 1. Further, the weighted average reflectance of the resulting product was also measured. The results are shown in Table 1.

Example 4

With the exception of replacing the TLP-4 with DDP-10 (manufactured by Nikko Chemicals Co., Ltd., a compound of the above formula (1) in which $R^1$ is an alkyl group of 12 to 15 carbon atoms, n=2 and m=10), the releasability was evaluated in the same manner as the example 1. Further, the weighted average reflectance of the resulting product was measured. The results are shown in Table 1.

Example 5

With the exception of replacing the TLP-4 with JP-506H (manufactured by Johoku Chemical Co., Ltd., a compound of the above formula (1) in which $R^1$ is an alkyl group of 4 carbon atoms, n=1 and 2, and m=1), the releasability was evaluated in the same manner as the example 1. Further, the weighted average reflectance of the resulting product was measured. The results are shown in Table 1.

Example 6

With the exception of replacing the TLP-4 with INT-1856 (a (poly)oxyethylene alkyl phosphate ester compound, manufactured by Axel Plastics Research Laboratories, Inc.), the releasability was evaluated in the same manner as the example 1. Further, the weighted average reflectance of the resulting product was measured. The results are shown in Table 1.

Example 7

With the exception of altering the amount added of the INT-1856 to 0.05 parts by mass, the releasability was evaluated in the same manner as the example 6. Further, the weighted average reflectance of the resulting product was measured. The results are shown in Table 1.

Example 8

With the exception of altering the amount added of the INT-1856 to 0.3 parts by mass, the releasability was evaluated in the same manner as the example 6. Further, the weighted average reflectance of the resulting product was measured. The results are shown in Table 1. In the example 8, transfer was continued beyond 1,000 repetitions, and even after 3,000 transfers, there were no resin residues and the peel strength was 4 N/m, confirming that the initial peel strength had been maintained.

Example 9

With the exception of altering the amount added of the INT-1856 to 0.5 parts by mass, the releasability was evaluated in the same manner as the example 6. Further, the weighted average reflectance of the resulting product was measured. The results are shown in Table 1.

Example 10

With the exception of replacing the active energy ray-curable resin composition A with the active energy ray-curable resin composition B, the releasability was evaluated in the same manner as the example 1. Further, the weighted average reflectance of the resulting product was measured. The results are shown in Table 1.

Comparative Example 1

A transfer test was conducted and the releasability was evaluated using the active energy ray-curable resin composition A and the mold obtained in the production example. Further, the weighted average reflectance of the resulting product was also measured. The results are shown in Table 1.

Comparative Example 2

With the exception of replacing the active energy ray-curable resin composition A with the active energy ray-curable resin composition B, the releasability was evaluated in the same manner as the comparative example 1. Further, the weighted average reflectance of the resulting product was measured. The results are shown in Table 1.

Comparative Example 3

With the exception of replacing the TLP-4 with BL-9EX (manufactured by Nikko Chemicals Co., Ltd., a polyoxyethylene lauryl ether in which the number of repeating oxyethylene units is 9), the releasability was evaluated in the same manner as the example 1. Further, the weighted average reflectance of the resulting product was also measured. The results are shown in Table 1.

Comparative Example 4

With the exception of replacing the TLP-4 with BL-4.2 (manufactured by Nikko Chemicals Co., Ltd., a polyoxyethylene lauryl ether in which the number of repeating oxyethylene units is 4.2), the releasability was evaluated in the same manner as the example 1. Further, the weighted average reflectance of the resulting product was also measured. The results are shown in Table 1.

Comparative Example 5

With the exceptions of not performing the steps (i, j and k) for treating the mold with a release agent, and altering the amount added of the TLP-4 to 0.3 parts by mass, the releasability was evaluated in the same manner as the example 1. Further, the weighted average reflectance of the resulting product was also measured. The results are shown in Table 1.

Comparative Example 6

With the exception of not performing the steps (i, j and k) for treating the mold with a release agent, the releasability was evaluated in the same manner as the example 8. Further, the weighted average reflectance of the resulting product was also measured. The results are shown in Table 1.

nm and a height of 220 nm, confirming that the shape of the mold had been reproduced with good transfer precision.

On the other hand, in the comparative examples 1 to 4, which did not contain the (poly)oxyethylene alkyl phosphate ester compound, the releasability could not be maintained.

Further, in the comparative examples 5 and 6, where the mold was not treated in advance with a release agent, the initial releasability was unsatisfactory, and resin adhesion occurred.

TABLE 1

|  |  |  | Internal release agent | | | Releasability | | | | |
| --- | --- | --- | --- | --- | --- | --- | --- | --- | --- | --- |
|  |  |  |  | Amount | | First repetition | | 1,000th repetition | | Weighted |
|  |  | Resin composition | Name | added [parts by mass] | Mold release agent | Resin residue | Peel strength [N/m] | Resin residue | Peel strength [N/m] | average reflectance [%] |
| Example | 1 | A | TLP-4 | 0.1 | yes | A | 3 | A | 3 | 0.4 |
|  | 2 | A | TDP-10 | 0.1 | yes | A | 5 | A | 12 | 0.4 |
|  | 3 | A | TDP-2 | 0.1 | yes | A | 5 | A | 7 | 0.4 |
|  | 4 | A | DDP-10 | 0.1 | yes | A | 5 | A | 15 | 0.4 |
|  | 5 | A | JP-506H | 0.1 | yes | A | 4 | A | 5 | 0.4 |
|  | 6 | A | INT-1856 | 0.1 | yes | A | 5 | A | 4 | 0.4 |
|  | 7 | A | INT-1856 | 0.05 | yes | A | 4 | A | 7 | 0.4 |
|  | 8 | A | INT-1856 | 0.3 | yes | A | 4 | A | 4 | 0.4 |
|  | 9 | A | INT-1856 | 0.5 | yes | A | 5 | A | 6 | 0.4 |
|  | 10 | B | TLP-4 | 0.1 | yes | A | 7 | A | 11 | 0.4 |
| Comparative example | 1 | A | — | — | yes | A | 5 | B 240th repetition | 34 | 0.4 |
|  | 2 | B | — | — | yes | A | 9 | B 240th repetition | 52 | 0.4 |
|  | 3 | A | BL-4.2 | 0.1 | yes | A | 4 | B 400th repetition | 31 | 0.4 |
|  | 4 | A | BL-9EX | 0.1 | yes | A | 5 | B 400th repetition | 27 | 0.4 |
|  | 5 | A | TLP-4 | 0.3 | no | B | 30 | — | — | — |
|  | 6 | A | INT-1856 | 0.3 | no | B | 17 | — | — | — |

In the examples 1 to 10, the peel strength during release was low and the mold release was able to be performed easily, both after the initial transfer and after the 1,000th transfer, and no resin adhesion to the mold was observed.

In the comparative examples 1 to 4, the peel strength during release was low and the mold release was able to be performed easily after the initial transfer, and no resin adhesion to the mold was observed, but prior to the 1,000th transfer, the peel strength gradually increased and resin adhesion to the mold was noticed.

In the comparative examples 5 and 6, resin adhesion was observed at the edges of the transfer region from the initial transfer.

In this manner, in the examples 1 to 10, by combining the active energy ray-curable resin composition of the present invention containing a (poly)oxyethylene alkyl phosphate ester compound with a mold that had been coated in advance with a release agent, even when a single mold was used to perform 1,000 repetitions of the production of a product having a fine concave-convex structure on the surface, resin adhesion to the mold did not occur, and favorable releasability was able to be maintained. Moreover, this releasability improvement effect was obtained regardless of whether the active energy ray-curable resin composition was hydrophobic or hydrophilic, meaning the degree of freedom in designing the resin is high. Furthermore, when the shape of the convex protrusions of the transferred fine concave-convex structure were observed, the convex protrusions had a substantially conical shape with a spacing between the protrusions of 100

Example 11

Using samples of the active energy ray-curable resin composition C to which 0.3, 0.1, 0.05 and 0.01 parts by mass respectively of INT-1856 had been added per 100 parts by mass of the polymerizable compounds, the substrate adhesion was evaluated.

In the compositions containing 0.1, 0.05 and 0.01 parts by mass of INT-1856, the peel strength was 2 to 3 N, which is approximately the same as that observed when no INT-1856 was added, confirming that the adhesion was maintained. However, when 0.3 parts by mass of INT-1856 was added, the peel strength was 0.7 N, indicating that the adhesion had decreased.

INDUSTRIAL APPLICABILITY

The active energy ray-curable resin composition and the production method for a product having a fine concave-convex structure on the surface according to the present invention are useful in the efficient mass production of anti-reflective products, anti-fogging products, anti-fouling products and water repellent products

DESCRIPTION OF THE REFERENCE SIGNS

14: Oxidized coating (anodized alumina)
20: Roll-shaped mold
38: Active energy ray-curable resin composition

The invention claimed is:

1. A production method for a product having a cured resin layer with a fine concave-convex structure formed on a surface of a substrate, the method comprising filling a space between a mold having a fine concave-convex structure composed of anodized alumina on a surface thereof and a substrate with an active energy ray-curable resin composition, and curing the composition by irradiation with active energy rays, thereby forming a cured resin layer into which the fine concave-convex structure has been transferred on a surface of the substrate, wherein
(A) the method comprises treating a surface of the mold with a release agent, at least at transfer initiation,
(B) the active energy ray-curable resin composition comprises a polymerizable compound, a polymerization initiator, and a (poly)oxyethylene alkyl phosphate ester compound, and
an average spacing between convex protrusions or concave recesses of the fine concave-convex structure is not more than 400 nm.

2. The production method for a product having a cured resin layer with a fine concave-convex structure formed on a surface of a substrate according to claim 1, wherein the (poly)oxyethylene alkyl phosphate ester compound is a compound represented by a formula (1) shown below:

$$(HO)_{3-n}(O=)P[-O-(CH_2CH_2O)_m-R^1]_n \quad (1)$$

wherein $R^1$ represents an alkyl group, m represents an integer of 1 to 20, and n represents an integer of 1 to 3.

3. The production method for a product having a cured resin layer with a fine concave-convex structure formed on a surface of a substrate according to claim 1, wherein an amount of the (poly)oxyethylene alkyl phosphate ester compound is within a range from 0.01 to 1 part by mass, relative to 100 parts by mass of the polymerizable compound.

4. The production method for a product having a cured resin layer with a fine concave-convex structure formed on a surface of a substrate according to claim 2, wherein an amount of the (poly)oxyethylene alkyl phosphate ester compound is within a range from 0.01 to 1 part by mass, relative to 100 parts by mass of the polymerizable compound.

5. The production method according to claim 1, wherein said active energy ray-curable resin composition has a viscosity of 2,000 mPa·s or less at 25° C.

6. The production method according to claim 1, wherein said fluorine compound has a hydrolyzable silyl group.

7. The production method according to claim 5, wherein said fluorine compound has a perfluoropolyether structure.

8. A mass production method for producing a product having a cured resin layer with a fine concave-convex structure formed on a surface of a substrate using the same mold, the method comprising
(i) filling a space between a mold having a fine concave-convex structure composed of anodized alumina on a surface thereof and a substrate with an active energy ray-curable resin composition,
(ii) curing the composition by irradiation with active energy rays, thereby forming a cured resin layer into which the fine concave-convex structure has been transferred on a surface of the substrate,
(iii) recovering the product having a cured resin layer with a fine concave-convex structure formed on a surface of the substrate, and
repeating steps (i), (ii) and (iii) in sequence using the same mold to produce corresponding numbers of the product having a cured resin layer with a fine concave-convex structure formed on a surface of the substrate, wherein
(A) the method comprises treating a surface of the mold with a fluorine compound, at least at transfer initiation,
(B) the active energy ray-curable resin composition comprises a polymerizable Compound, a polymerization initiator, and a (poly)oxyethylene alkyl phosphate ester compound, And
an average spacing between convex protrusions or concave recesses of the fine concave-convex Structure is not more than 400 nm.

9. The mass production method according to claim 8, wherein steps (i)-(iii) are repeated at least 1,000 times.

10. The mass production method according to claim 9, wherein steps (i)-(iii) are repeated up to 3,000 times.

11. A mass production method for producing a product having a cured resin layer with a fine concave-convex structure formed on a surface of a substrate using a rotating roll-shaped mold having a fine concave-convex structure composed of anodized alumina on a surface thereof in which the convex protrusions or concave recesses have an average spacing therebetween of not more than 400 nm, the method comprising, while rotating the roll-shaped mold,
(i) feeding a belt-shaped substrate to the roll-shaped mold provided the surface of the substrate is spaced apart from the opposing surface of the rotating mold when conducting the feeding so as to receive an active energy ray-curable resin composition therebetween;
(ii) introducing an active energy ray-curable resin composition into the space between the rotating mold and the belt-shaped substrate when conducting the feeding to form a curable resin layer into which the fine concave-convex structure is transferred, the active energy ray-curable resin composition comprising a polymerizable compound, a polymerization initiator, and a (poly)oxyethylene alkyl phosphate ester compound;
(iii) forming the cured resin layer into which the fine concave-convex structure has been transferred on the surface of the belt-shaped substrate by irradiating the curable resin layer active energy ray-curable composition with active energy rays; and
(iv) peeling the product from the surface of the rotating roll-shaped mold, the product comprising the cured resin layer having the fine concave-convex structure formed on the surface of the belt-shaped substrate,
wherein the method includes
(v) treating a surface of the mold with a fluorine compound, at least at transfer initiation.

12. The mass production method according to claim 11, wherein said belt-shaped substrate comprises a film.

13. The mass production method according to claim 12, wherein (i) comprises nip rolling the belt-shaped substrate to the rotating mold, and (ii) comprises introducing the active energy ray-curable resin composition into the space so the belt-shaped substrate and the composition are nip rolled to the rotating mold.

* * * * *